US006519898B2

(12) United States Patent
Tatsumi et al.

(10) Patent No.: US 6,519,898 B2
(45) Date of Patent: Feb. 18, 2003

(54) WINDOW PANEL SUPPORTING STRUCTURE OF WINDOW REGULATOR

(75) Inventors: Hisato Tatsumi, Kanagawa-ken (JP); Yasuo Ootsuki, Kanagawa-ken (JP); Syunsuke Tamura, Kanagawa-ken (JP)

(73) Assignee: OHI Seisakusho Co. Ltd., Kanagawa-ken (JP)

( * ) Notice: Subject to any disclaimer, the term of this patent is extended or adjusted under 35 U.S.C. 154(b) by 0 days.

(21) Appl. No.: 10/011,500

(22) Filed: Oct. 30, 2001

(65) Prior Publication Data

US 2002/0050100 A1 May 2, 2002

(30) Foreign Application Priority Data

Oct. 31, 2000 (JP) ....................................... 2000-332776

(51) Int. Cl.[7] .................................................. B60J 1/16
(52) U.S. Cl. ......................................................... 49/375
(58) Field of Search .......................... 49/374, 375, 348, 49/349

(56) References Cited

U.S. PATENT DOCUMENTS

| | | | | | |
|---|---|---|---|---|---|
| 4,991,351 | A | | 2/1991 | Bertolini | |
| 5,502,926 | A | * | 4/1996 | Grace et al. | 49/375 |
| 5,546,704 | A | * | 8/1996 | Maruoka | 49/375 |
| 5,622,005 | A | * | 4/1997 | Ochenski et al. | 49/375 |
| 5,848,496 | A | * | 12/1998 | Bertolini et al. | 49/375 |
| 5,966,872 | A | * | 10/1999 | Wasek et al. | 49/374 |

FOREIGN PATENT DOCUMENTS

| | | | |
|---|---|---|---|
| GB | 2 099 897 | A | 12/1982 |
| GB | 2 313 873 | A | 12/1997 |
| JP | 57209421 | | 12/1982 |
| JP | 58026623 | | 2/1983 |
| JP | 58026625 | A | 2/1983 |
| JP | 9095130 | A | 4/1997 |
| JP | 2001018655 | A | 1/2001 |

* cited by examiner

*Primary Examiner*—Jerry Redman
(74) *Attorney, Agent, or Firm*—Kilpatrick Stockton LLP

(57) ABSTRACT

The invention provides a window panel supporting structure of a window regulator having a positioning element along a window panel surface in which a positioning projection (31*c*) protruded in any one of a panel holder (31) and a fastening and supporting portion (17) and a positioning groove (17*b*) formed in another thereof are engaged with each other.

8 Claims, 4 Drawing Sheets

WINDOW PANEL SUPPORTING STRUCTURE OF WINDOW REGULATOR

BACKGROUND OF THE INVENTION

1. Field of the Invention

The present invention relates to a window panel supporting structure of a window regulator, and more particularly to a window panel supporting structure of a window regulator structured such that a lower end portion of the window panel is supported and fixed to a fastening and supporting portion of a moving body which vertically moves so as to vertically move the window panel.

2. Description of the Related Art

An apparatus of the above type is, as disclosed in Japanese Patent Application Laid-Open Publication No. 9-169213, structured such that a lower end portion of the window panel is gripped by two parts comprising a fixed portion and a movable portion in the fastening and supporting portion mounted to the movable body vertically moving.

SUMMARY OF THE INVENTION

However, in the structure of the related art, since the fastening and supporting portion is constituted by the fixed portion and the movable portion, a number of the parts is increased, so that there is a problem that a manufacturing cost is increased at that degree.

Further, since there is no means for determining a position in a horizontal direction along a surface of the window panel at a time of assembling the fastening and supporting portion with a panel holder, it is necessary to position by bringing a panel side edge portion into contact with a glass run guiding the panel side edge portion, so that an operability is deteriorated. In this case, when a force applied to the glass run has a dispersion, a position between the glass run and the window panel side edge portion is not determined. Accordingly, there is generated a dispersion in a sliding resistance with respect to the glass run, the sliding resistance applied from the glass run is applied only to one side, and there is a risk that a bottom portion of the glass run generates an abnormal abrasion. In the case mentioned above, there is a risk that a problem is generated in a durability of the constituting parts, and there is a problem that it is necessary to adjust the position.

The present invention has been achieved by taking the problems mentioned above in the related art into consideration, and an object of the present invention is to provide a window panel supporting structure of a window regulator which reduces a number of parts, improves an assembling operability by providing a positioning means, improves a positioning accuracy of the window panel so as to do away with an abnormal abrasion, and improves a durability of the constituting parts.

A first aspect of the present invention provides a window panel supporting structure of a window regulator comprising: a panel holder adhered to a lower end portion of the window panel; a fastening and supporting portion provided in a moving body capable of vertically moving; and the panel holder being fastened and supported to the fastening and supporting portion, wherein a positioning means is constituted by a positioning projection protruded from any one of the panel holder and the fastening and supporting portion, and a positioning groove formed in another thereof and engaging with the positioning projection.

In accordance with the invention described in the first aspect, since the panel holder is directly fixed to the fastening and supporting portion, the number of the parts is reduced, and a cost reduction of the window regulator can be intended.

Further, at a time of mounting the window panel, the positioning is completed only by engaging the positioning projection with the positioning groove. Thereafter, the assembling operation is completed only by fastening the panel holder to the fastening and supporting portion by the fastening member. Since the positioning between the panel holder and the fastening and supporting portion is easily executed, an assembling operability is improved.

Further, since the panel holder and the fastening and supporting portion are securely positioned by the positioning means in which the positioning projection and the positioning groove are engaged with each other, a positioning accuracy of the window panel is improved.

Since the positioning accuracy of the window panel is improved, there is not generated an abnormal abrasion of the constituting parts such as the glass run or the like caused by a displacement of the window panel, so that a durability of the constituting parts is improved.

DETAILED DESCRIPTION OF THE PREFERRED EMBODIMENT

Figure 1:
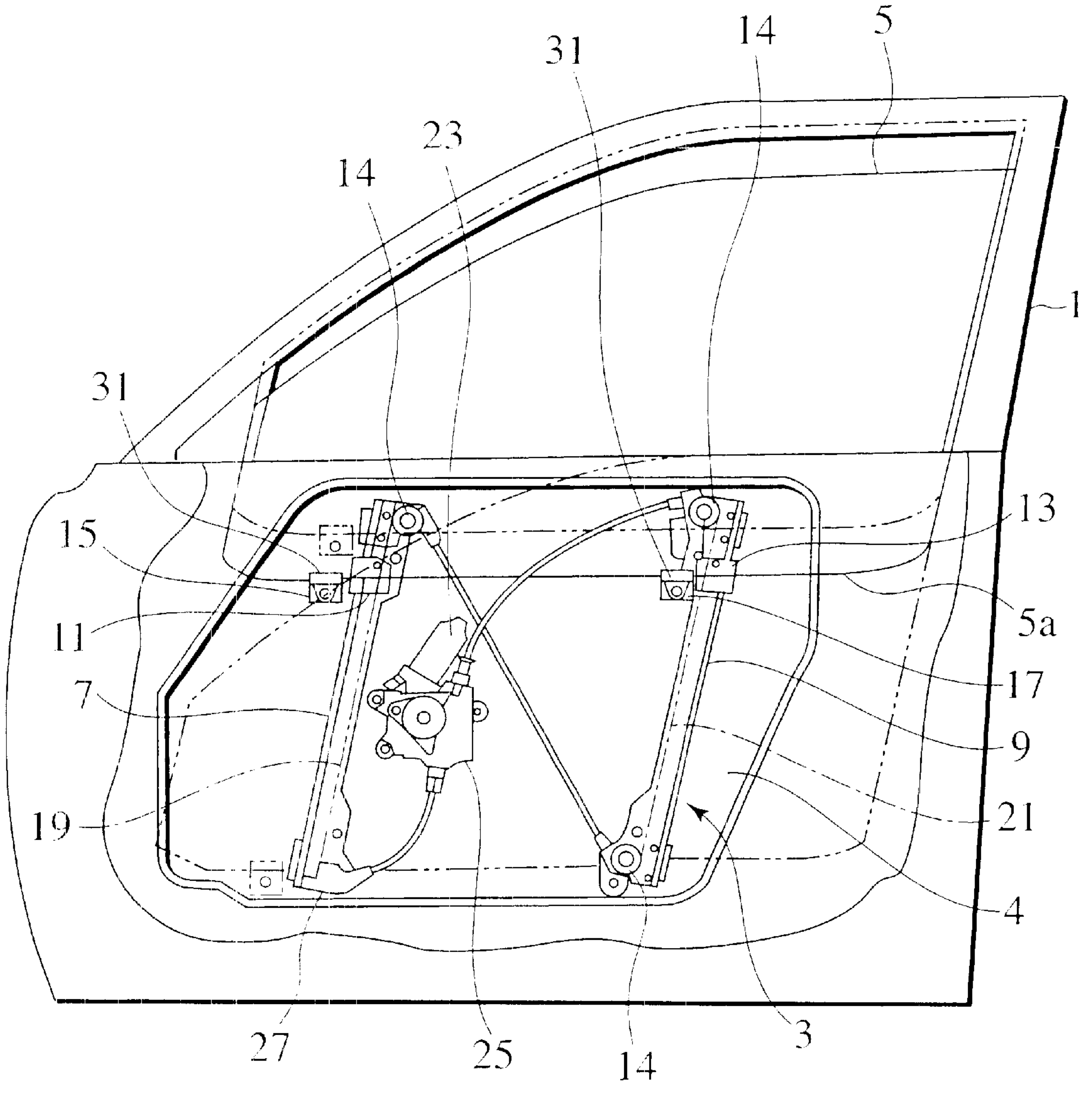
FIG. 1 is a front elevational view of a door for a motor vehicle to which a window regulator in accordance with an embodiment of the present invention is mounted.

A description will be given of an embodiment in accordance with the present invention with reference to the accompanying drawings. FIG. 1 shows a window regulator 3 mounted to a left door 1 of a motor vehicle. In FIG. 1, a left side corresponds to a front side of the motor vehicle, and a front side in the drawing corresponds to an outer side of the vehicle in the door 1. In this case, the window regulator 3 is previously mounted to a base plate 4, and the base plate 4 in which the window regulator 3 is assembled is mounted to the door 1 from an inner side of the vehicle.

The window regulator 3 is a cable type window regulator, and is provided with two rails 7 and 9 which are in parallel to each other, are in parallel to a moving direction of a window panel 5, are a little offset rearward in upper portions, and are placed in an inclined state, moving bodies 11 and 13 which are mounted so as to vertically slide the respective rails 7 and 9, fastening and supporting portions 15 and 17 which are adhered to the respective moving bodies 11 and 13 and support the window panel 5, and cables 19 and 21 which are provided along the rails 7 and 9 and between the rails 7 and 9 in an X-shaped manner. End portions of the respective cables 19 and 21 are connected to the moving bodies 11 and 13 by a known means (not shown).

The cables 19 and 21 are arranged and wired between the rails 7 and 9 so as to form an X shape, and are connected to a drive apparatus 25 having a motor unit 23 in the middle of the wiring. One cable 19 is wired so as to pass through a cable guide 27 at a lower end portion of the rail 7 and pass through a floating pulley 14 at an upper end portion of the rail 9. Further, another cable 21 is wired so as to pass through the floating pulley 14 at an upper end portion of the rail 7 and a lower end portion of the rail 9.

Figure 2:
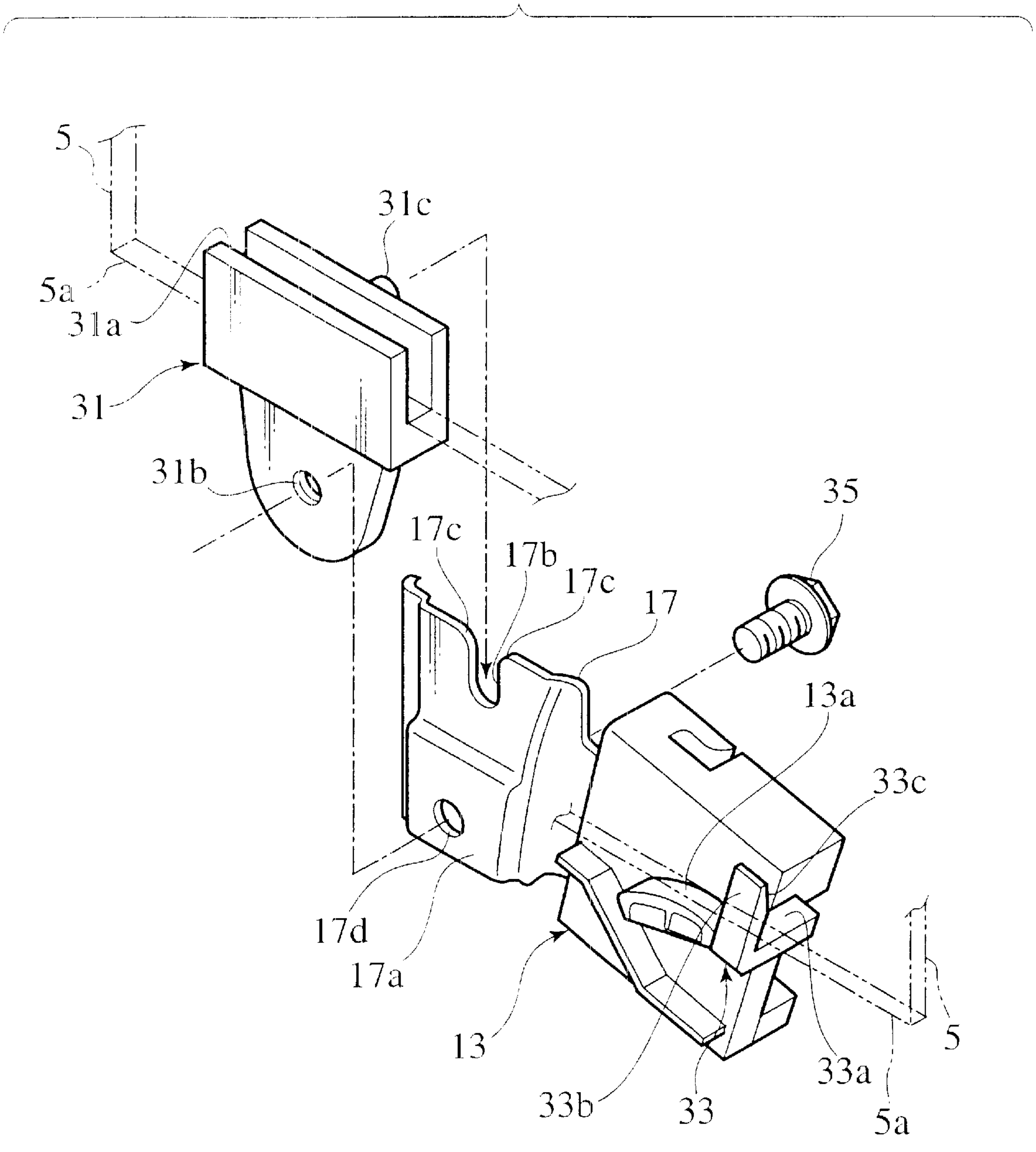
FIG. 2 is an exploded perspective view showing a window panel supporting structure corresponding to a main portion in FIG. 1.
Figure 3:
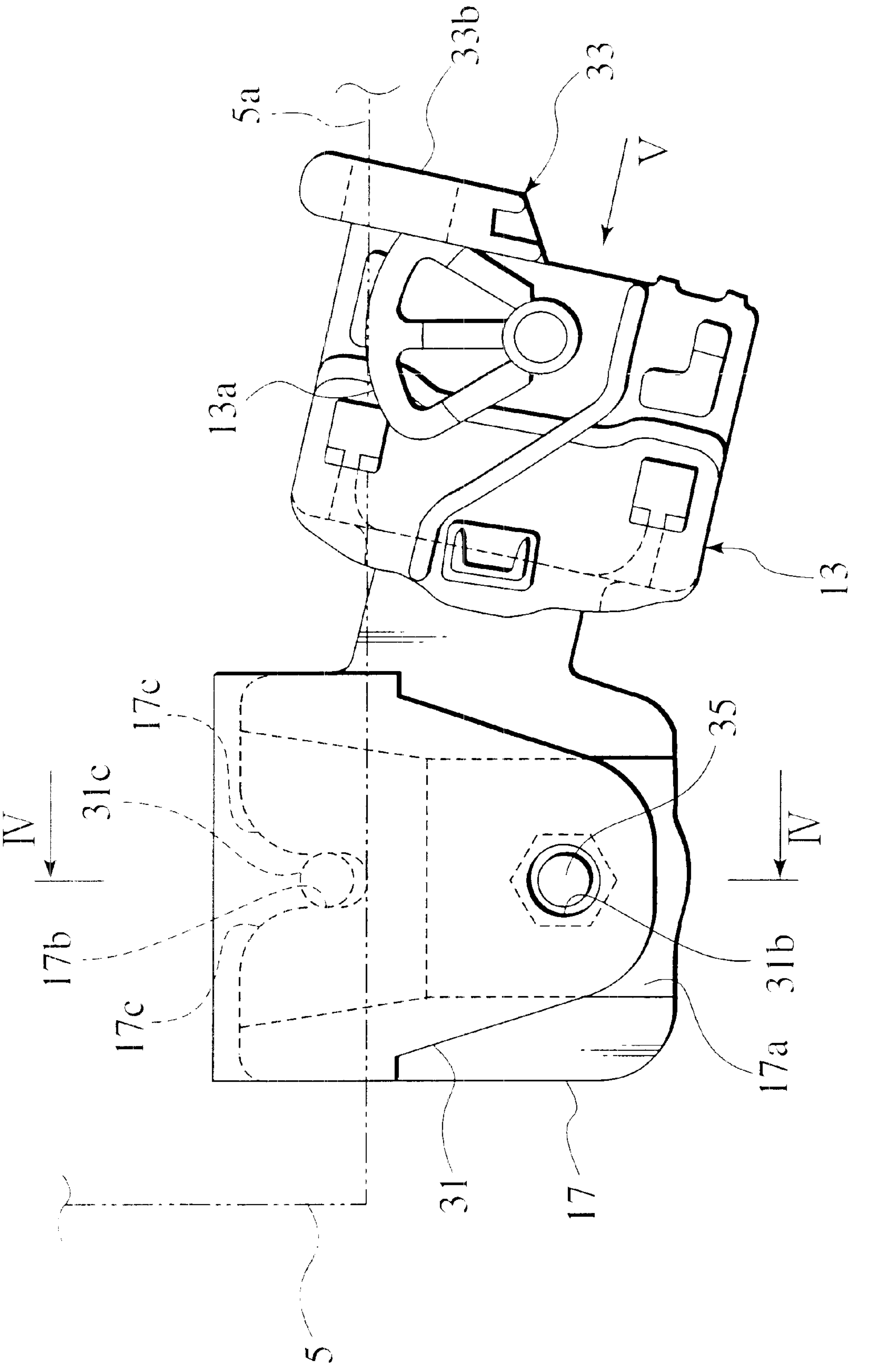
FIG. 3 is a front elevational view in FIG. 2.

FIG. 2 shows the moving body 13 in a rear side among the moving bodies 11 and 13. In FIG. 2, a right upward side corresponds to an inner side of the vehicle, a left downward side corresponds to an outer side of the vehicle, a left upward side corresponds to a front side and a right downward side corresponds to a rear side. FIG. 3 shows the moving body 13 shown in FIG. 1 in an enlarged manner. In this case, since the moving body 11 in a front side basically has the same structure, a detailed description will be omitted.

A window panel supporting structure of a window regulator in accordance with the present embodiment corresponds to a supporting structure for mounting the window panel 5 inserted from a gap provided above the door 1 to the window regulator 3 previously mounted to the base plate 4 shown in FIG. 1, and is structured such as to fasten a resin panel holder 31 adhered to the window panel 5 to the fastening and supporting portion 17 adhered to the moving body 13 by a bolt 35 corresponding to a fastening means.

A groove portion 31*a* of the resin panel holder 31 is adhered to a lower end portion 5*a* of the window panel 5 by an adhesive bonding means. A female screw hole 31*b* extending through the resin panel holder 31 is formed in a lower portion of the resin panel holder 31, and a screw with which the bolt 35 corresponding to the fastening means is engaged is provided in the female screw hole 31*b*. Further, a cylindrical positioning projection 31*c* is protruded on a surface outside the vehicle in the resin panel holder 31.

The fastening and supporting portion 17 adhered to the moving body 13 is manufactured by a press forming process. A U-shaped notched positioning groove 17*b* open to the above is formed in an upper end center portion of a fixed portion 17*a* in the fastening and supporting portion 17. The positioning groove 17*b* constitutes a positioning means which engages with the positioning projection 31*c* so as to position in a horizontal direction along the window panel 5 surface, at a time of assembling the resin panel holder 31. A guide inclined portion 17*c* having a groove width expanded toward an outer side is formed in an inlet of the positioning groove 17*b*, for the purpose of making an inserting operation of the positioning projection 31*c* easy. A mounting hole 17*d* through which the bolt 35 is extended is provided below the positioning groove 17*b* of the fixed portion 17*a* in the fastening and supporting portion 17.

Figure 5:
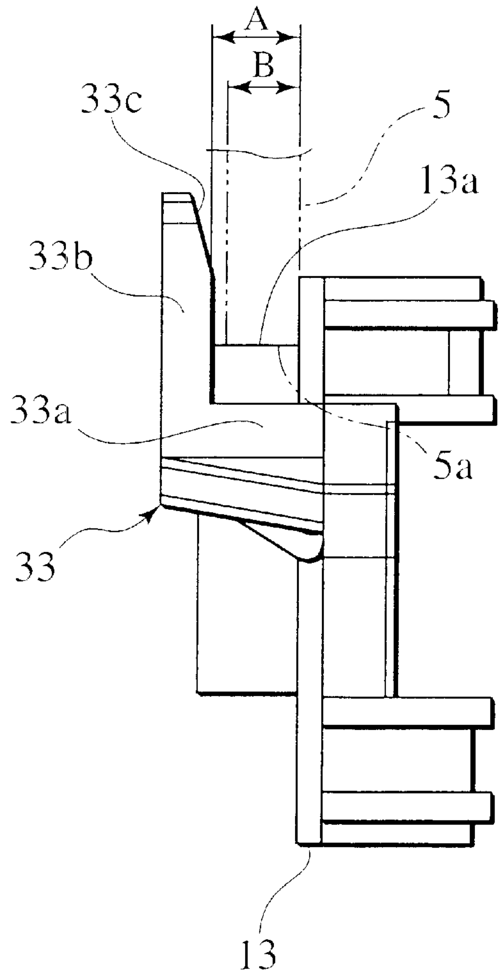
FIG. 5 is a view as seen from a line V in FIG. 3.

A supporting portion 13*a* supporting the lower end portion 5*a* of the window panel 5 and a projection 33 upward standing from the surface outside the vehicle in the supporting portion 13*a* are formed on the surface outside the vehicle in the moving body 13. The projection 33 is constituted by a horizontal portion 33*a* horizontally protruded from the moving body, and a vertical portion 33*b* extended upward from an end portion of the horizontal portion 33*a*. A width A from the surface outside the vehicle in the moving body 13 to a surface opposing to the moving body 13 in the vertical portion 33*b* of the projection 33 is set to become a little larger than a thickness B of the window panel 5 (refer to FIG. 5), and a space enough for receiving the window panel 5 is formed between the moving body 13 and the projection 33. Further, a greatly inclined-notched guide inclined portion 33*c* is formed in an upper end portion of the vertical portion 33*b* of the projection 33.

In order to assemble the resin panel holder 31 of the window panel 5 in the fastening and supporting portion 17, the positioning projection 31*c* protruded in the resin panel holder 31 is inserted to the positioning groove 17*b* formed in the fixed portion 17*a* of the fastening and supporting portion 17 from the above. At this time, even when the position of the positioning projection 31*c* is slightly displaced from the positioning groove 17*b*, the guide inclined portion 17*c* guides the positioning projection 31*c* to a desired position. As a result, the positioning projection 31*c* can smoothly enter within the positioning groove 17*b* corresponding to a regular position.

At this time, the lower end portion 5*a* of the window panel 5 is simultaneously inserted from the above between the surface outside the vehicle of the moving body 13 and the vertical portion 33*b* of the projection 33 and is mounted on the supporting portion 13*a* of the moving body 13, thereby being temporarily held. Even if the position of the lower end portion 5*a* of the window panel 5 is slightly displaced outside the vehicle at this time, the window panel 5 can be guided by the guide inclined portion 33*c* so as to smoothly enter between the surface outside the vehicle in the moving body 13 and the vertical portion 33*b* of the projection 33 which corresponds to the regular position.

In this state, a position of the female screw hole 31*b* in the resin panel holder 31 coincides with a position of the mounting hole 17*d* of the fastening and supporting portion 17, and is structured such that the bolt 35 can be inserted thereto.

Figure 4:
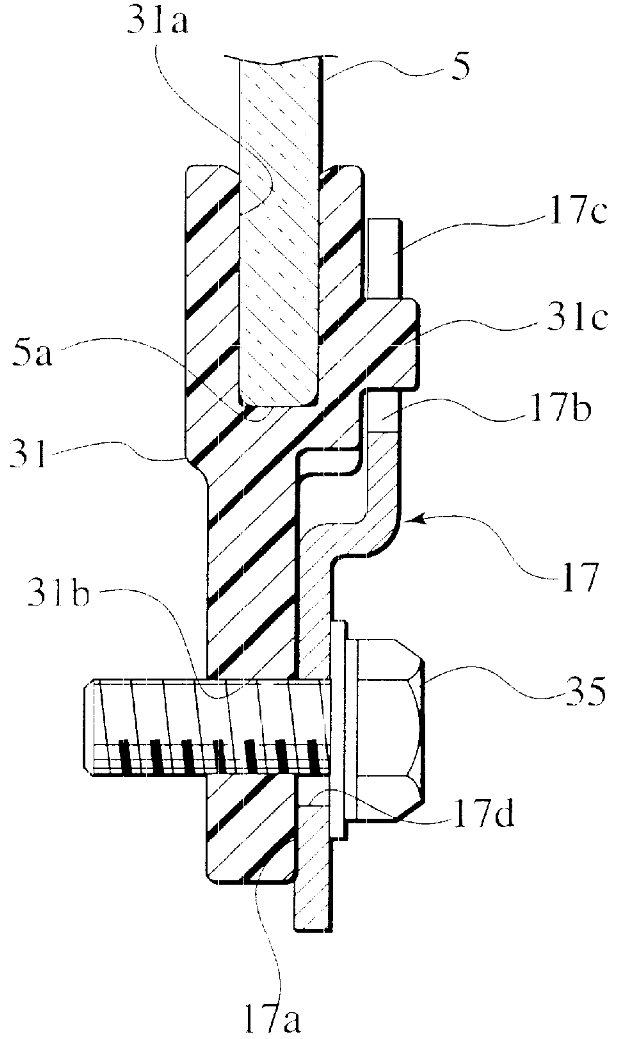
FIG. 4 is a cross sectional view along a line IV—IV in FIG. 3.

In this case, when inserting the bolt 35 to the mounting hole 17*d* of the fastening and supporting portion 17 from the inner side of the vehicle so as to screw and fasten to the female screw hole 31*b* of the resin panel holder 31, it is possible to firmly fasten the resin panel holder 31 to the fastening and supporting portion 17 as shown in FIG. 4.

As mentioned above, in accordance with the present embodiment, since the resin panel holder 31 is directly fixed to the fastening and supporting portion 17, the number of the parts can be reduced, and a cost reduction of the window regulator 3 can be intended.

Further, at a time of mounting the window panel 5, the positioning is completed only by the positioning means for engaging the positioning projection 31*c* with the positioning groove 17*b* open to the above, and thereafter, the assembling operation is completed only by fastening the resin panel holder 31 to the fastening and supporting portion 17 by the bolt 35. Since the positioning between the resin panel holder 31 and the fastening and supporting portion 17 is easily executed, an assembling operability is improved.

Further, since the resin panel holder 31 and the fastening and supporting portion 17 are securely positioned by the positioning means in which the positioning projection 31*c* and the positioning groove 17*b* are engaged with each other, a positioning accuracy of the window panel 5 is improved.

Since the positioning accuracy of the window panel 5 is improved, there is not generated an abnormal abrasion of the constituting parts such as the glass run or the like caused by a displacement of the window panel 5, so that a durability of the constituting parts is improved.

Since the projection 33 capable of supporting the surface opposite to the side facing to the fastening and supporting portion 17 of the lower end portion 5*a* in the window panel 5 is formed in the moving body 13, it is possible to hold the window panel 5 between the projection 33 and the moving body 13 until fastening the window panel 5 temporarily assembled in the moving body 13 to the fastening and supporting portion 17, whereby it is possible to prevent the window panel from falling down and it is possible to improve an assembling operability.

Further, even when the resin panel holder 31 moves in a direction of a thickness of the window panel 5 during the fastening operation of the resin penal holder 31 by the bolt 35, the window panel 5 is brought into contact with the vertical portion 33*b* of the projection 33 so as to be prevented from further moving, so that it is possible to significantly improve an assembling operability within the door 1 in which the window panel 5 can not held directly by hands.

What is claimed is:

1. A window panel supporting structure of a window regulator comprising:

a window panel;

a panel holder adhered to a lower end portion of the window panel;

a fastening and supporting portion fastening and supporting the panel holder; and a moving body provided with the fastening and supporting portion and capable of vertically moving, wherein a positioning means is constituted by a positioning projection protruded in any one of the panel holder and the fastening and supporting portion, and a u-shaped notched positioning groove formed in another of the panel holder and the fastening and supporting portion and engaging with the positioning projection.

2. A window panel supporting structure of a window regulator according to claim 1, wherein the moving body has a projection in a side in which the window panel faces to the moving body.

3. A window panel supporting structure of a window regulator according to claim 1, wherein the panel holder is constituted by a resin.

4. A window panel supporting structure of a window regulator according to claim 1, wherein a female screw hole is provided in the panel holder, a bolt extends through a mounting hole and the female screw hole provided in the fastening and supporting portion, thereby fastening and fixing the panel holder to the moving body.

5. A window panel supporting structure of a window regulator according to claim 1, wherein the moving body has a supporting portion in a side in which the projection is provided, and a lower end portion of the window panel is mounted on an upper surface of the supporting portion so as to be temporarily held.

6. A window panel supporting structure of a window regulator comprising:

a window panel;

a panel holder adhered to a lower end portion of the window panel;

a fastening and supporting portion fastening and supporting the panel holder;

a moving body provided with the fastening and supporting portion and capable of vertically moving, and a projection provided in a side in which the window panel faces to the moving body; wherein the projection is constituted by a horizontal portion horizontally protruded from the moving body and a vertical portion extended upward from an end portion of the horizontal portion, and the window panel is held between the projection and the moving body; and wherein a position means is constituted by a positioning projection protruded in any one of the panel holder and the fastening and supporting portion, and positioning groove formed in another of the panel holder and the fastening and supporting portion and engaging with the positioning projection.

7. A window panel supporting structure of a window regulator according to claim 6, wherein the vertical portion further has a guide inclined portion at an upper end portion of the vertical portion.

8. The window panel supporting structure as in claim 6, wherein the positioning groove is a U-shaped notched positioning groove.

* * * * *